April 18, 1939.　　　F. O. SHAFFER　　　2,154,706
COMBUSTION DEVICE
Filed May 19, 1937
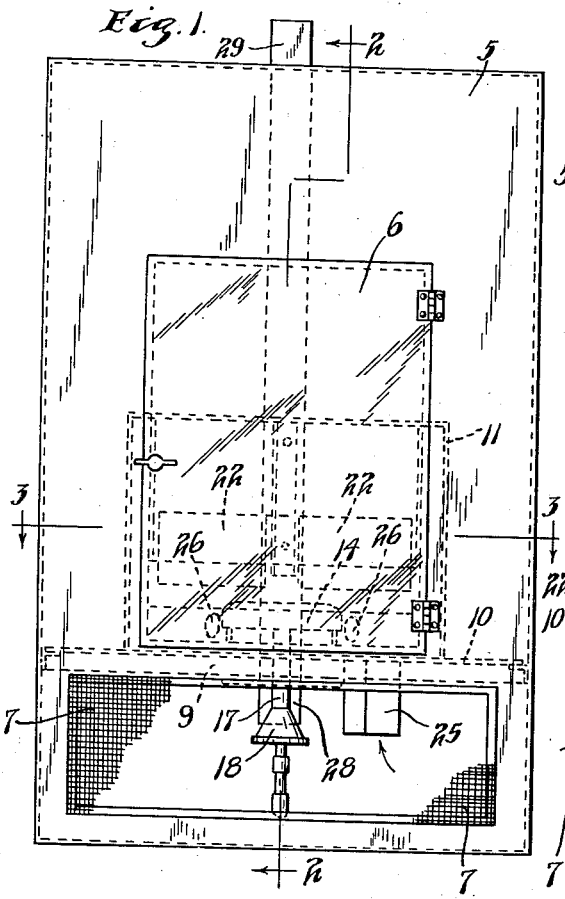
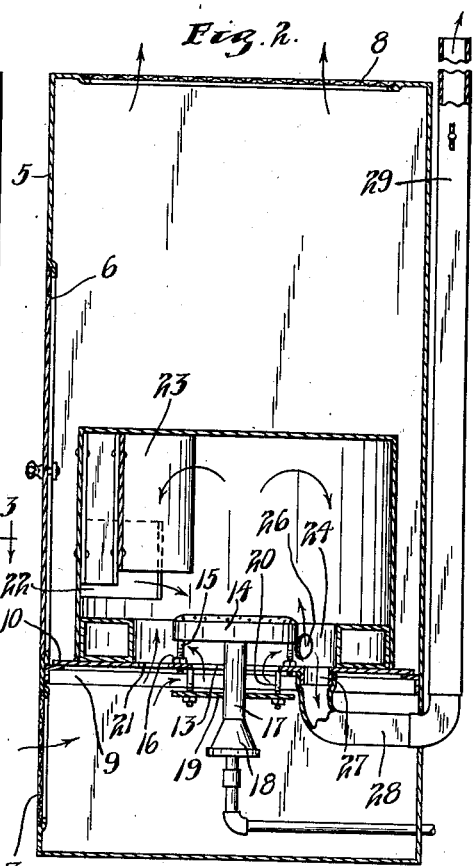
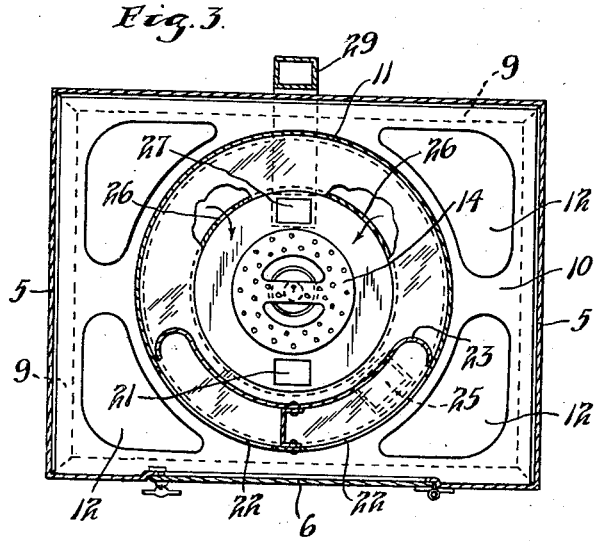
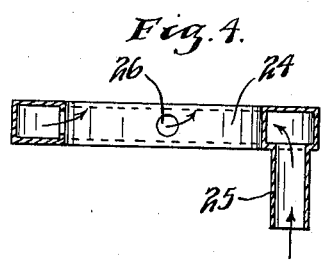
INVENTOR.
FREDRICK O. SHAFFER.
BY HIS ATTORNEYS.
Williamson & Williamson Patented Apr. 18, 1939

2,154,706

UNITED STATES PATENT OFFICE 2,154,706

COMBUSTION DEVICE

Fredrick O. Shaffer, Minneapolis, Minn., assignor of one-half to James T. Hegland, Minneapolis, Minn.

Application May 19, 1937, Serial No. 143,500

4 Claims. (Cl. 126—90)

This invention relates to combustion devices of a type suitable for use as a heating installation wherein air is circulated past a heating chamber and recirculated after it is cooled.

An object of the invention is to provide a combustion apparatus which may be operated with a gaseous fuel and which will insure practically complete combustion of all of the fuel.

Another object of the invention is to provide a structure wherein a room or similar enclosure is heated by passing a large quantity of air through the heater and heating it to a relatively less extent than is the case where smaller quantities of air are circulated and it is necessary to heat them to higher temperatures.

A further object of the invention is to provide a combustion device wherein the products of combustion are carried off and are not circulated with the air being heated.

These and further objects and advantages of the invention will more fully appear from the following description, made in connection with the accompanying drawing, wherein like reference characters refer to the same or similar parts throughout the views, and in which, Fig. 1 is a front elevation;

Fig. 2 is a vertical section taken approximately on the line 2—2 of Fig. 1;

Fig. 3 is a transverse section taken on the line 3—3 of Fig. 1; and

Fig. 4 is a vertical section through the preheating manifold.

In the embodiment shown in the drawing, I have provided an outer casing 5 which is preferably of sheet metal and which may be coated with an enamel to improve its appearance. The front face of the casing is provided with an opening covered by a door 6 which is preferably hinged and provided with a suitable latch. The lower front portion of the casing has a screened opening 7 and practically the entire top of the casing comprises a screened outlet 8.

Around the inside of the walls of the casing just above the screened opening 7 is a piece of angle iron 9 which is adapted to support a flat plate-like element 10. The element 10 acts as a bottom and support for the cylindrical heating chamber 11 and as best shown in Fig. 3, the plate 10 is provided with cut out portions 12 to permit circulation of air upwardly through the outer casing around the heating chamber and out of the screened outlet 8.

The center of the plate 10 is provided with a relatively large opening 13 through which a suitable burner element 14 extends, the burner element being secured to the plate by bolts 15 which are provided with nuts 16 so that the burner may be properly positioned in a horizontal plane. The lower portion of the burner includes a pipe 17 which is positioned within the opening 13 and the lower end of which carries a valve device or inspirator 18 for mixing air with the gaseous fuel. This valve device is not shown in detail since it is a conventional pipe such as is ordinarily used on gas burners. Below the opening 13 and around the pipe portions 17 of the burner is a disk-like valve 19 which is suspended from bolts 20, the latter being provided with nuts on their lower ends below the disk 19 so that said disk can be raised or lowered with respect to the opening 13 to control the volume of air flowing through said opening. Another smaller opening 21 is formed through the plate 10 adjacent the burner, so that air flowing upwardly through it will arise beside the burner and near its flame.

The heating chamber 11 is provided with a pair of openings 22 in that portion of the wall of the chamber near the door 6, although the exact positioning of the openings 22 at that point is not absolutely necessary. These openings are provided to admit a certain portion of the air circulating upwardly around the chamber as an additional aid to combustion of the gaseous fuel. Spaced slightly inwardly from the openings 22 is a baffle plate 23 which preferably conforms to the curvature of the heating chamber 11 and as shown in Fig. 2, this baffle extends from the top of the heating chamber to a point adjacent the lower edges of said openings 22. The baffle 23 is used to more or less cover the openings 22, so that proper circulation of the burning gases or gases which have been either completely or partially burned will not be affected by air flowing in through the openings 22. Furthermore, the stream of air arising through the opening 21 will merge with the air entering from the side wall openings 22 and will form a barrier to prevent the escape of gases out through the opening.

Around the lower part of the heating chamber 11 is disposed a circular preheating manifold 24 which has an inlet mouth 25 extending upwardly from beneath the heating chamber supporting plate 10. Air entering the manifold 24 will be partially heated as it circulates through the manifold and it is then discharged inwardly toward the burner through ports 26. Toward the rear of the heating chamber is an outlet 27 for the products of combustion which are lead through a conduit 28 to a flue 29. This flue will draw the products of combustion out of the heating chamber in accordance with well known principles.

When the burner 14 has been ignited, the hot gases arising from the flame will rise upwardly to the top of the heating chamber 11 and mushroom outwardly toward the side wall of the heating chamber and thence downwardly to the lower portion of the chamber. While there is an admixture of air with the gaseous fuel because of the provision of the valve 18 at the bottom of the burner, it has been found that often the fuel gases are incompletely burned, with the result that the burner operates with reduced efficiency. However, in my construction air will be circulating into the bottom of the main casing 5, with a considerable proportion of it flowing upwardly through the openings 12 between the outside of the heating chamber 11 and the inside walls of the casing 5. Not all of the air entering the lower inlet 7 will take this path however. Some of it will flow upwardly through the central opening 13 in the sheet 10. Some of it will flow up through the small forwardly disposed opening 21 and some will enter the inlet 25 and be conducted into the preheating manifold 24. The air flowing up through the openings 13 and 21 will mingle with the gas and air mixture coming out of the holes in the burner 14 to assist in providing a sufficient oxygen supply for proper combustion. Furthermore, combustion is greatly improved by the issuance of heated air from the openings 26 in the preheating manifold 24, this air having circulated through the manifold. The manifold obtains its heat directly from its proximity to the flame produced by the burner 14 and also obtains heat from the walls of the heating chamber 11 with which it is in contact. Thus it is seen that an ample supply of oxygen is provided in addition to the air mixed with the fuel before it enters the burner, itself.

Should the fuel be not quite completely consumed, air entering the openings 22 in the wall of the heating chamber will accumulate behind the baffle 23 and gradually feed inwardly under the baffle to mix with air entering the opening 21 and also with any unburned gases which have first circulated upwardly toward the top of the chamber and have then been deflected downwardly by the baffle. As a result and with the cooperation of the air entering through the openings 21 and 22, there is no opportunity for any of the fuel gases to escape either through to the outer casing or through the conduit 28 and up the flue 29. None of the waste products of combustion are mixed with air which circulates upwardly around the outside of the heating chamber and out of the discharge opening 8 in the upper portion of the outer casing 5. This is due to the fact that all openings between the interior of the outer casing and the interior of the heating chamber 11 are arranged to admit air inwardly into the heating chamber and the natural tendency of the heavier gases released as a result of the combustion is to settle toward the bottom of the heating chamber and be drawn outwardly by the draft produced in the flue 29.

As has been stated in the first part of the specification, my heater is devised to produce a large volume of flow of air through the chamber 5, said air being heated to a lesser degree than if it was brought into intimate contact with the flame of the burner. This relatively large volume of air is made available through the provision of the large screened inlet 7 at the bottom of the casing 5 and the large outlet 8 in the top of the casing. The heat radiating from the heating chamber 11 will cause sufficiently rapid upward movement of heated air through the casing 5, so that it is not necessary to provide a blower or other means for increasing circulation. It should be particularly remembered that, because of the complete burning of all fuel gases either immediately upon their introduction, or after recirculation, there is no possibility of explosion due to the accumulation of unburned or partially burned gases in the heating chamber.

The construction disclosed in the drawing has the further advantage of being relatively comfortable to the touch. It is a well known fact that many types of heaters become so hot on their outer walls that it is dangerous to place these heaters where persons may accidentally lean against them. In my invention the heating chamber 11 is spaced inwardly from the walls of the casing 5 and the air circulating between the inner walls of the casing and the outer walls of the heating chamber will absorb most of the heat radiating from the heating chamber leaving the walls of the outer casing free of any excessive heat.

It will, of course, be understood that various changes may be made in the form, details, arrangement and proportions of the various parts without departing from the scope of the present invention.

What is claimed is:

1. In a combustion device, an outer casing, a gaseous fuel burner within said casing, means for mixing unheated air with said fuel prior to combustion, said casing having means for directing unheated air to said burner adjacent the point of combustion, a manifold adjacent said burner for preheating and directing air toward said point of combustion, a heating chamber substantially enclosing said burner and being entirely enclosed in its upper side and top portions, means for withdrawing products of combustion from said heating chamber, and said outer casing having upper and lower openings to permit circulation of air upwardly through said casing and around said heating chamber.

2. The structure in claim 1 and said heating chamber having additional opening for admitting air from said casing to the interior of said heating chamber to mix with partially burned gases.

3. In a combustion device, an outer casing, a plate supported across the lower part of said casing, said plate having a central aperture, a gaseous fuel burner extending upwardly through said aperture, the aperture being substantially larger than that portion of the burner extending through whereby air is admitted upwardly from beneath said burner, said plate also having an opening of relatively smaller size to admit air upwardly adjacent the side of said burner, an air preheating manifold positioned around said burner and having an air inlet extending downwardly through said plate, said heating chamber having an outlet and flue communicating with said outlet.

4. In a combustion device, an outer casing, a plate supported across the lower part of said casing, said plate having a central aperture, a gaseous fuel burner extending upwardly through said aperture, the aperture being substantially larger than that portion of the burner extending through whereby air is admitted upwardly from beneath said burner, said plate also having an opening of relatively smaller size to admit air upwardly adjacent the side of said burner, an air preheating manifold positioned around said burner and having an air inlet extending downwardly through said plate, said heating chamber having an opening in its side wall adapted to admit air from said outer casing, and a baffle adjacent said last mentioned opening inside of said chamber to control the circulation of burning and burned gases in said chamber adjacent said opening, the lower edge of said baffle terminating at a point at least as high as the upper edge of said burner, whereby air flow beneath said baffle will be directed inwardly and laterally toward the top of said burner.

FREDRICK O. SHAFFER.